No. 614,185. Patented Nov. 15, 1898.
B. F. STEWART.
HARVESTER FRAME.
(Application filed Apr. 17, 1895.)
(No Model.) 6 Sheets—Sheet 5.
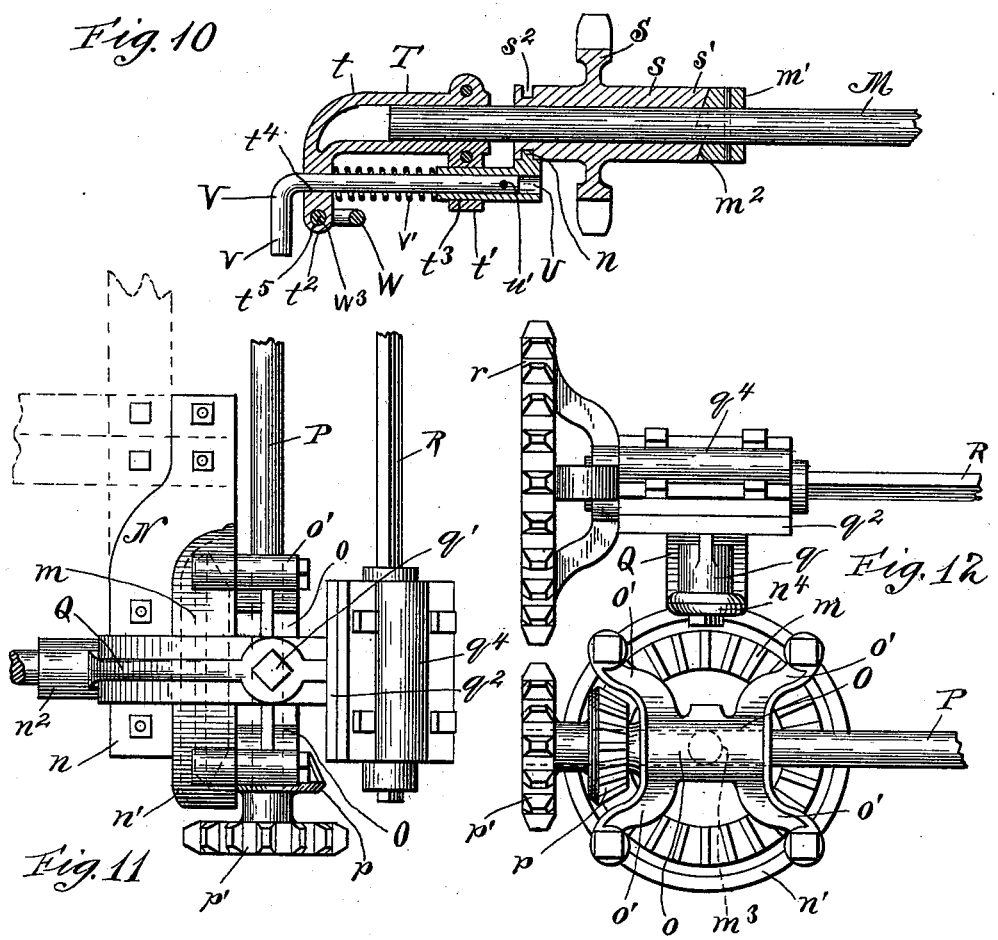
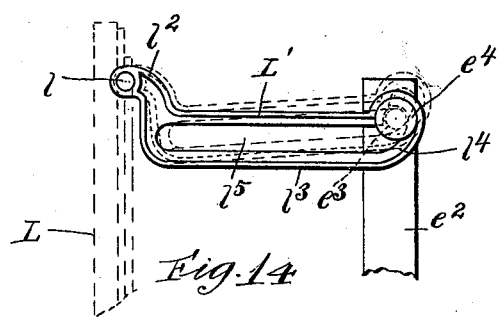
Witnesses:
Inventor:
Benjamin F. Stewart,
Attys.

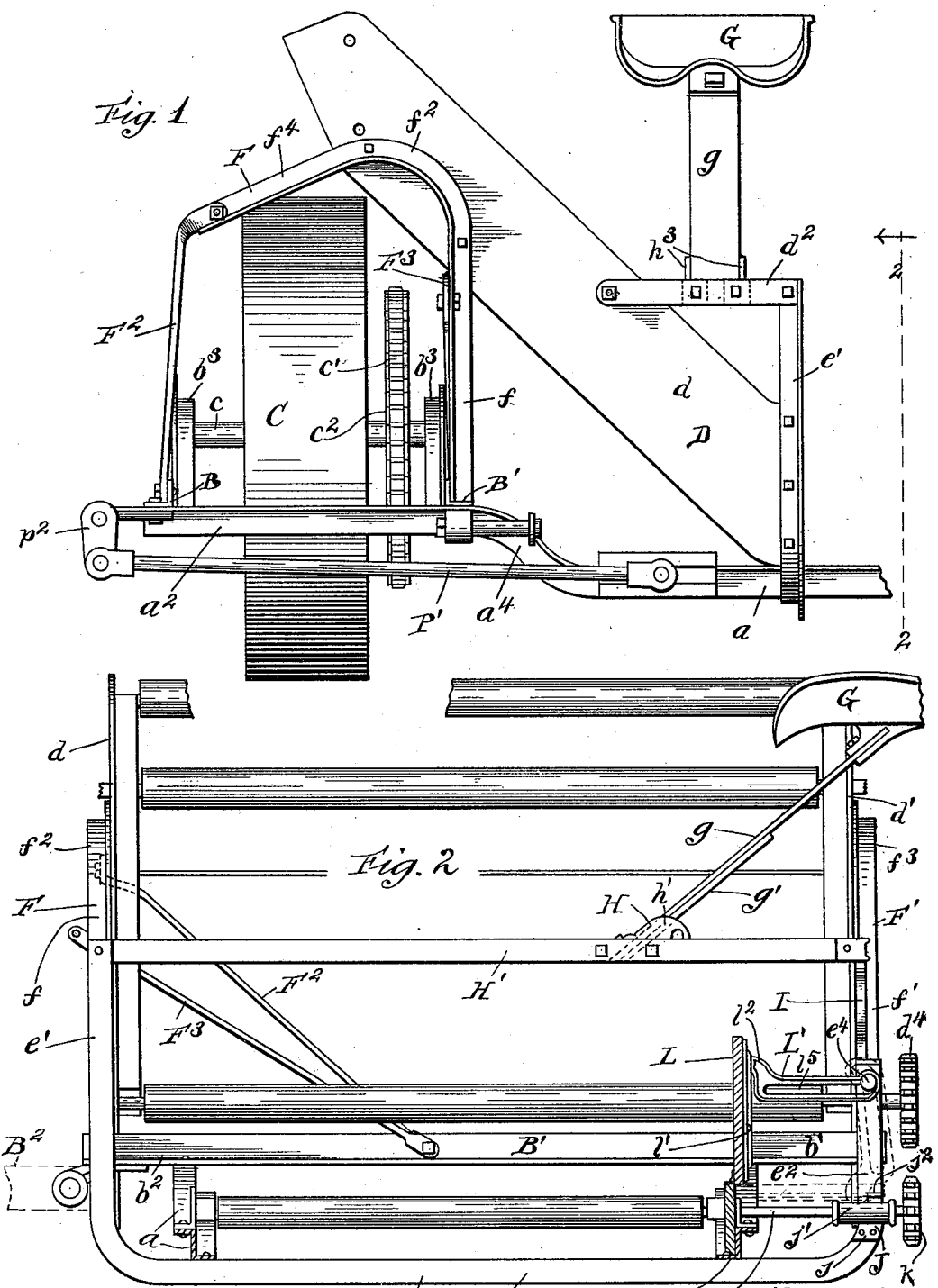

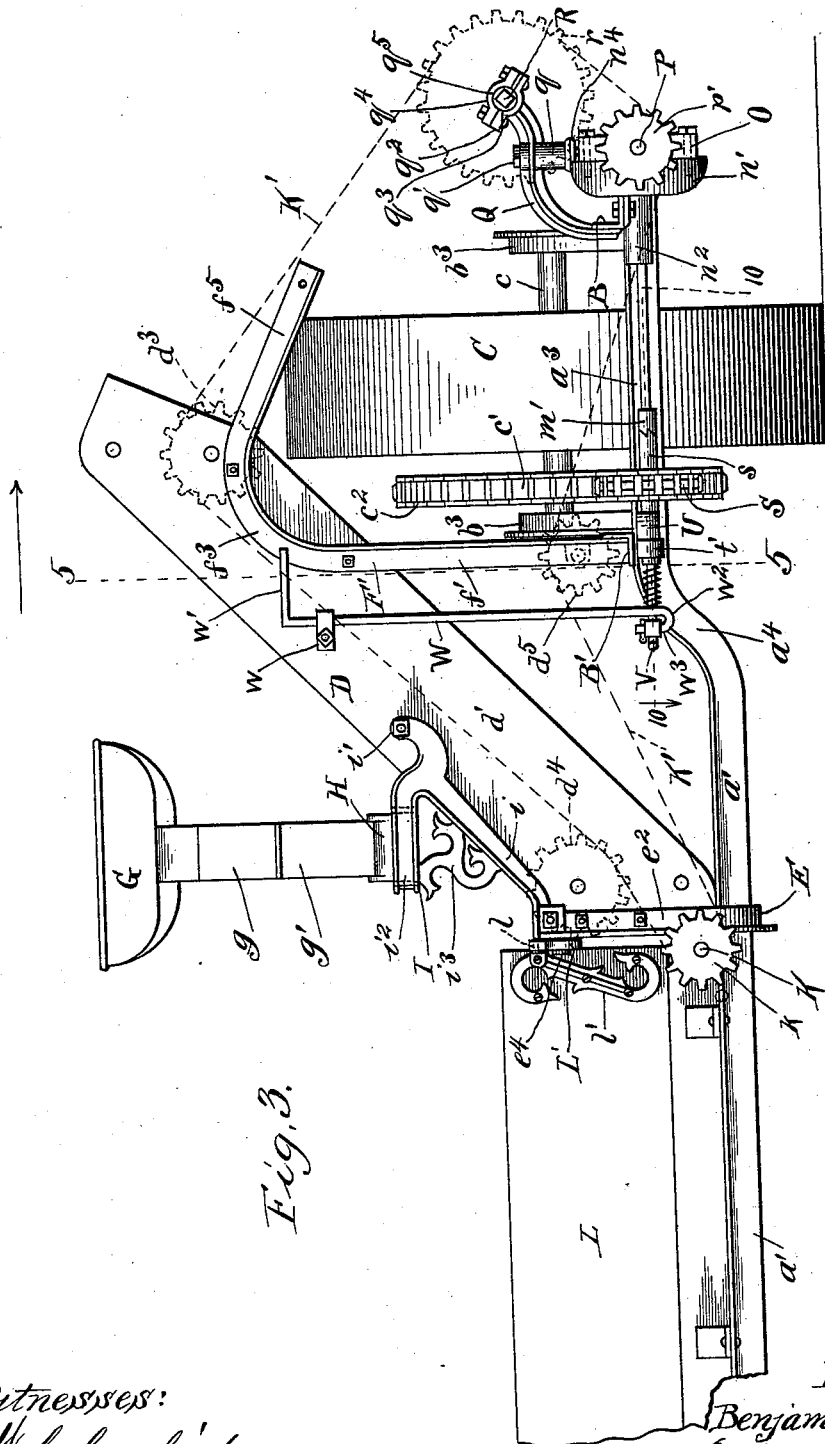

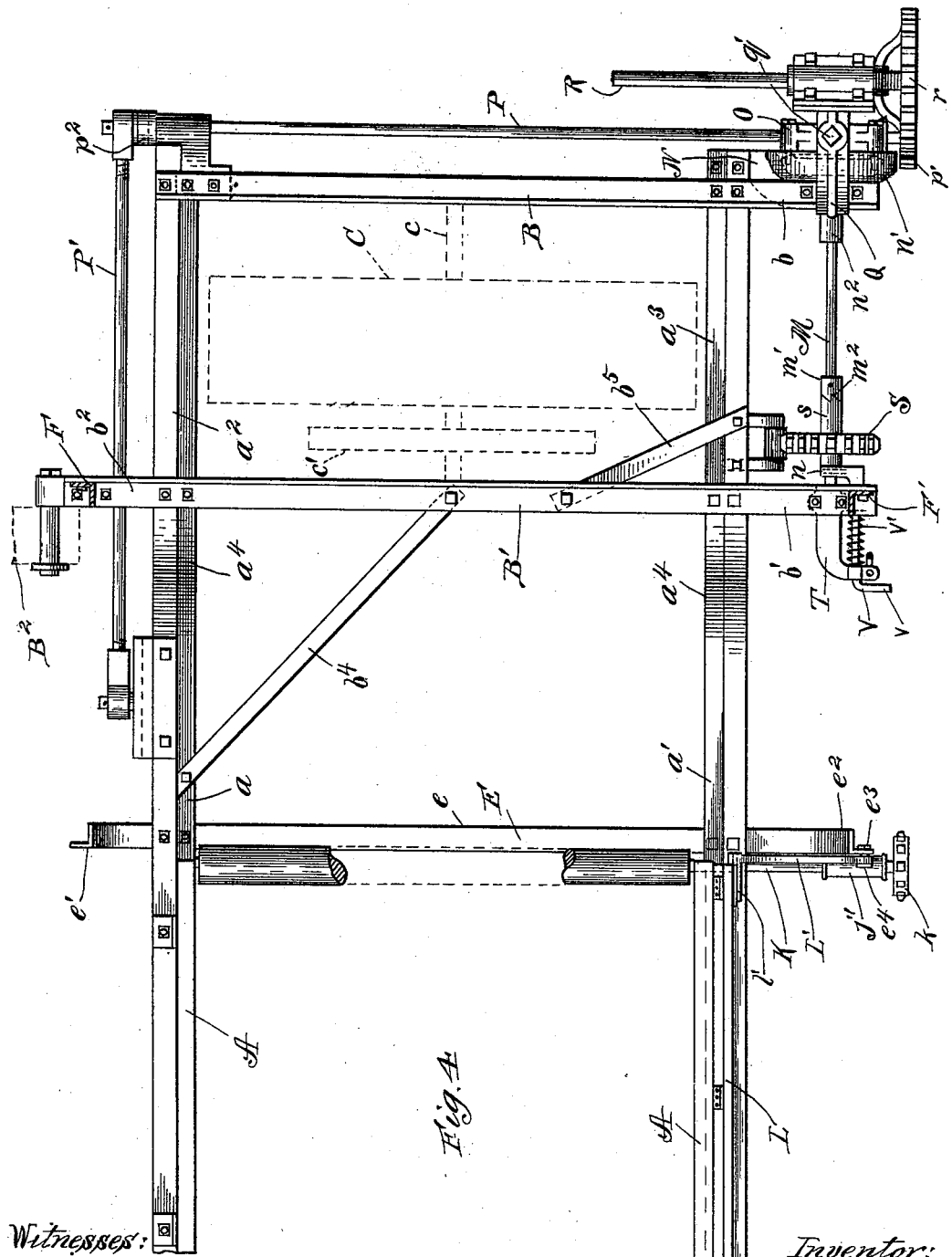

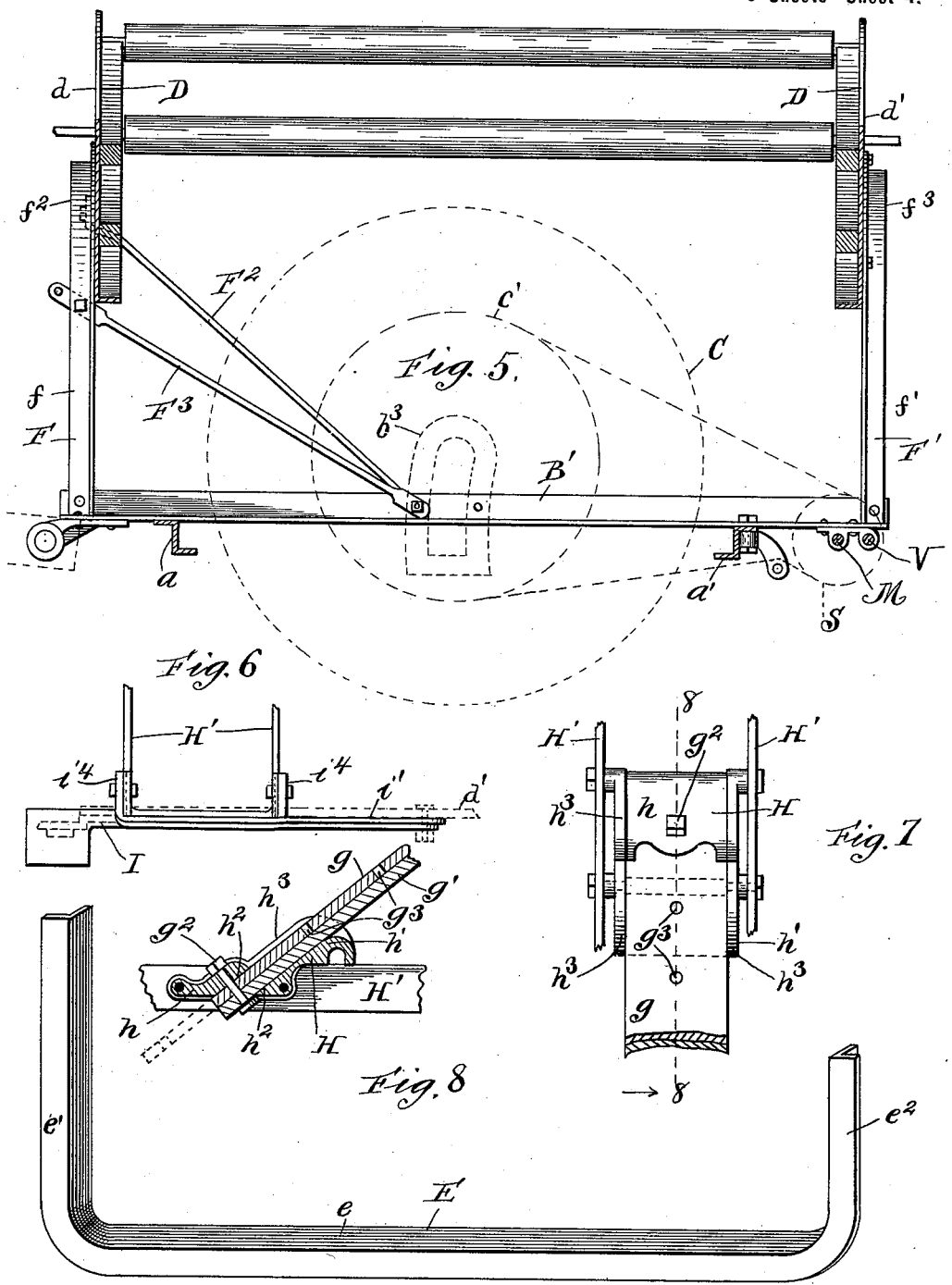

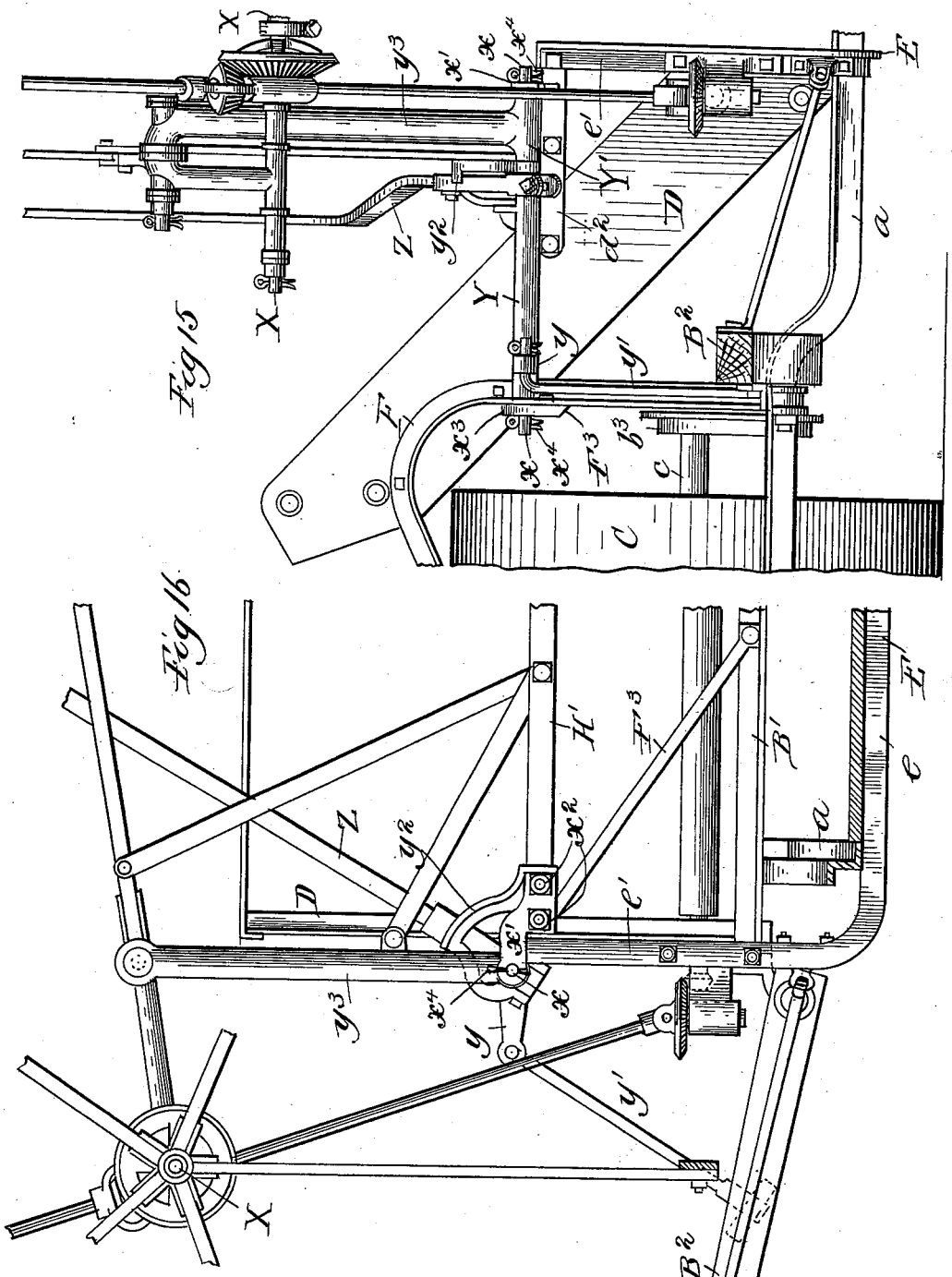

UNITED STATES PATENT OFFICE.

BENJAMIN F. STEWART, OF CHICAGO, ILLINOIS.

HARVESTER-FRAME.

SPECIFICATION forming part of Letters Patent No. 614,185, dated November 15, 1898.

Application filed April 17, 1895. Serial No. 546,126. (No model.)

*To all whom it may concern:*

Be it known that I, BENJAMIN F. STEWART, a citizen of the United States, residing at Chicago, in the county of Cook and State of Illinois, have invented certain new and useful Improvements in Harvester-Frames, which are fully set forth in the following specification, reference being had to the accompanying drawings, in which—

Figure 1 represents a front elevation of a portion of a machine embodying my invention, taken at the stubble end thereof, the reel and its supports being omitted; Fig. 2, a transverse section of said machine, taken on the line 2 2 of Fig. 1 and looking toward the main wheel; Fig. 3, a rear elevation of the said machine, except the outer or grain end of the platform, the front upright of the U-beam not being shown; Fig. 4, a plan view of the machine with the elevator and binder frames and main portion of platform removed and the inner platform carrier-roller partly broken away; Fig. 5, a cross-section on the line 5 5, Fig. 3, looking toward the stubble; Fig. 6, a detail plan of the rear seat-bracket and rear ends of the seat-bars; Fig. 7, a detail plan of the lower end of the spring seat-support and the bracket to which it is attached; Fig. 8, a vertical section of the same on the line 8 8 of Fig. 7; Fig. 9, an elevation of the transverse U-shaped beam at the lower end of the elevator-frame, but detached therefrom; Fig. 10, a detail plan section of the clutch mechanism at the inner end of the counter-shaft, taken on the line 10 10 of Fig. 3; Fig. 11, a detail plan at the rear outer corner of the main frame of the machine, showing the outer end of the counter-shaft, the rear end of the cutter-shaft, and the rear end of the binder driving-shaft, with the chain-gearing on the latter removed; Fig. 12, an elevation of the same, looking toward the stubble end of the machine and with the binder chain-gearing mounted on its shaft; Fig. 13, a detail rear elevation at the inner end of the platform wind-board detached; and Fig. 14 a detail elevation of the wind-board link-support at the inner end of said board and looking toward the main wheel, the same being also shown in Fig. 2 under two adjustments. Fig. 15 is a cross-section of a portion of a harvester, showing a reel and its supports, parts of the structure being omitted for the sake of clearness. Fig. 16 is a front elevation of a portion of a harvester, taken at the stubble end, showing the manner in which the reel and its supports are mounted, certain parts being broken away or omitted for clearness of illustration.

Some of the views illustrating the details of the invention are drawn to a larger scale than the other main views of the machine.

The present invention relates to a harvesting-machine designed for cutting and binding grain. The main improvements are found in the main frame, upright frame, platform, and elevator; but there are also improvements in some other parts of the machine, which will be distinctly set forth in the course of the description of the construction and operation in detail of so much of a grain-binding harvester as is necessary to an understanding of my present invention.

The entire machine is not shown, for there are a number of main parts of a complete grain-harvester which are unimportant to the present invention and have no intimate relation thereto. These parts have been omitted from the drawings and will not be referred to in the description, except briefly, as may be necessary for explanation. A full and detailed description of the construction and operation of so much of a grain-harvester as is necessary for an understanding of the present invention will now be given, with reference to the figures of the drawings described above, and the particular improvements which are believed to be new and which it is desired to secure by Letters Patent will then be more clearly designated in claims following the description.

In the drawings, A represents the platform of the machine, $a$ being the front sill and $a'$ the rear sill thereof. These sills are preferably of Z angle-iron construction. They are, however, extended at their inner ends, so as to project outward beyond the ground-wheel and form a part of the main frame. For this purpose each sill instead of terminating inside of the main wheel is extended outward, one in front and the other in rear of the wheel and both some distance beyond the rim of the latter. These extensions are indicated by the letters $a^2$ $a^3$ in the drawings, the former being the extension of the front and the latter of the rear sill. Obviously these two sill extensions become the front and rear bars of the main frame, and as these bars are always in a plane somewhat higher than the platform-sills the latter are curved upward just inside the wheel, so as to bring the extensions into a higher plane than the sills proper. These upward bends or curves are marked $a^4$ in the drawings, and the sill extensions project out from the upper ends of the bends horizontally. The sill projections are tied or fastened together by the usual cross-bars B B', the former being the outer and the latter the inner with reference to the main wheel. Each of these cross-bars has a rear extension (marked, respectively, $b\ b'$) projecting beyond the rear-sill extension, and the inner cross bar or beam has a somewhat similar extension $b^2$ at its front end; but the outer bar terminates at the front platform-sill, as seen in Fig. 4, and both are secured to the respective sill extensions. These cross-bars are also preferably of angle-iron, and the usual slotted rack-standards $b^3$ are secured to them, respectively, for the reception of the main-wheel axle. The pole $B^2$ is hinged to the extension $b^2$ of the inner cross-bar.

The main or ground wheel C and its axle $c$ are of any ordinary construction, the latter being provided with the usual pinions to engage with the respective rack-standards, in the slots of which they are arranged, so that the standards and main frame may be adjusted vertically with reference to the axle. The axle is also provided with a chain-wheel $c'$, secured thereon just inside of the main wheel.

The elevator-frame D may be of any ordinary construction so far as the frame itself is concerned; but the means by which it is connected to and supported by the frame of the machine constitute a part of my present invention. At the lower or inner end of the elevator-frame there is a U-shaped beam E, preferably of angle-iron, the straight body portion $e$ of which is arranged directly underneath the platform-sills, being arranged transversely of said sills and secured thereto by bolts or any other suitable device. An upright arm at each end completes the U, these arms being in one piece with the body and produced by bending a straight bar so as to form this U shape. The front upright $e'$ is considerably longer or higher than the rear upright $e^2$, and when this U-beam is in place the said arms stand, respectively, a little distance in front and in rear of the platform-sills. The inner or lower end of the elevator-frame is secured to these uprights of the U-beam, the front side bar $d$ being bolted or otherwise secured to the longer front arm of the U, while the rear side bar $d'$ is similarly fastened to the rear arm $e^2$ of the same piece and in substantially the same way. The front arm of the U being longer than the rear arm extends up above the lower end of the elevator-frame, which is secured thereto and is connected to the front side bar thereof by a short horizontal bar $d^2$, by which a strong support is provided at the front of the machine for a certain purpose, which will presently be described, and the arm itself is steadied.

It will be seen that the bar $d^2$ is secured to the side board $d$ of the elevator D by means of a bolt $d^{20}$ (see Fig. 1) at a point approximately midway the upright $e'$ and the supporting-arch $f^2$, which will presently be described, thus forming an additional brace or support for the elevator-frame and giving greater rigidity to it.

The upright arms may be of the same length, if desired, the said upright arms being located some distance in front and rear of the platform-sills, as stated above. The space between them is considerably wider than the platform-apron, and as the side bars of the elevator-frame are secured at their lower ends to these uprights, respectively, obviously the width of the elevator-frame and the elevator-aprons mounted therein will be greater than that of the platform-apron. This arrangement provides for the delivery of the grain from the platform-apron to the elevator-aprons in a free space, the contact of both butts and heads with the sides of the elevator being entirely obviated by the extension of the elevator frame and aprons beyond the platform-apron both in front and rear of the latter.

A brace-bar $b^4$ is secured at its forward end to the front platform-sill just outside of the U-beam, and thence extends backward and outward in an inclined position to the inner cross-bar B', to which it is secured about midway of its length, thus providing a brace between this bar and the front platform-sill. At the rear end of the machine there is a similar brace-bar $b^5$, connected at one end to the same cross-bar, but in rear of the main wheel, and thence extending backward and outward to the rear platform-sill, to which it is secured at a point between the two cross-bars and almost directly in rear of the main wheel, whereby there is also provided a brace between the inner cross-bar and the rear platform-sill, though this latter brace is shorter than the former.

The upper end of the elevator-frame is supported by two steel angle-bar uprights or standards, one, F, at the front of the machine and the other, F', at the rear thereof, each being set upon and secured to the ends of the inner cross-bar. These standards are of peculiar shape. They extend up and project part way across the respective side pieces of the elevator-frame and are then bent over and outward on a curve, and their upper ends are projected outward in a nearly horizontal position in front and rear of the main wheel and a little outside the latter. In the drawings the upright portion of the standards is indicated, respectively, by $f$ and $f'$, the former at the front and the latter at the rear of the machine, the bends by the letters $f^2\ f^3$ in the same order, and the projecting upper ends by $f^4\,f^5$ in the same order. The bent portions of these standards are secured by bolts or any other suitable device to the respective sides of the elevator-frame, near its upper end, thereby providing a support for the latter, and the upper end sections $f^4\,f^5$ extend outward beyond the wheel from the bends and are slightly inclined downward from said bends. A brace-bar $F^2$ is connected at its upper end to the outer end of the front bent standard and extends downward and backward therefrom to the outer cross-bar of the main frame, to which its lower end is secured, thereby providing a stay for this projection of the standard over the wheel. There is also a somewhat similar brace-bar $F^3$ secured at its upper end to the upright portion of the bent standard, and extending thence backward and downward is fastened at its lower end to the inner cross-bar of the main frame. There is thus provided a firm and secure support for the upper end of the elevator-frame and also for the support of the binder-frame.

The seat G is mounted on the machine by special devices, which will now be described. A bracket H of somewhat peculiar construction is made to receive and hold the seat-support and also to provide for the adjustment of the latter. This bracket is made with a kind of base $h$, arranged between two horizontal bars $H'$, running transversely of the machine over the elevator-frame and a short distance inside the U-shaped beam E. The front ends of these bars are secured to the short cross-bar $d^2$, which connects the front upright of the U-beam to the front side of the elevator-frame. The rear ends of the said bars are fastened to and supported by a bracket I, which is secured to the rear upright of the U-beam and the rear side of the elevator-frame. This bracket consists of a long arm $i$, which is fastened at one end to the upper end of the rear U-beam standard and extends thence upward on an incline along the rear side piece of the elevator-frame, and near its upper end is bent in a little toward the main wheel and downward slightly to form a kind of hook-shaped extremity $i'$, by which it is bolted or otherwise fastened to the elevator-frame. At the upper end of the arm $i$ there is also a short arm $i^2$, which extends outward toward the platform horizontally in a direction opposite to the bent end of the bracket and making an acute angle with the arm $i$. Between the main arm $i$ and this short arm $i^2$ there is a kind of brace $i^3$, which may be of any form that fancy may suggest, but supports the outer end of the short horizontal arm. On the front side or face of the short arm $i^2$ there are two lugs or projections $i^4$, extending directly forward toward the front of the machine in a horizontal position. The rear ends of the seat-bars $H'$ are fastened, respectively, to these short studs or projections on the bracket by bolts or any other suitable device, as seen in Fig. 6.

The seat-bracket H is constructed with an extension $h'$, projecting upward from the rear end of the base and at the same time inclining backward. At the lower end of this inclined projection where it joins the base a slot $h^2$ is cut through the base on the same incline as the upper face of the projection, and from the ends of this slot upright flanges $h^3$ extend backward and upward along the respective edges of the incline. It will be seen from this description that this seat-bracket is provided with an inclined channel or guideway along its upper portion, terminating in a transverse slot through the base at the lower end of the said channel.

The seat G is mounted on the upper end of an elastic support $g$, which is preferably a wide strip or bar of steel or any other suitable elastic metal. This support or standard is adapted to the guideway and slot in the seat-bracket, though its thickness is less than the width of the slot. A second strip $g'$, also of elastic metal and of the same width as the seat-standard, is also fitted at its lower end to the same bracket, but underneath the seat-support, being of a thickness sufficient to fill the slot in the said bracket in connection with the seat-support $g$. This strip is a kind of supplemental support to the seat and extends only part way up the main support $g$, as seen in Fig. 2. The lower ends of these two strips are fastened to the bracket by means of a bolt $g^2$, passing through that section of the bracket-base in front of the slot backward and downward on an incline through the lower ends of the said strips, the lower end of the bolt coming through the strips just below the bracket-base. The bolt may be applied with the head either above or below the bracket. In the drawings it is shown below, while a nut is applied to the upper end above the bracket. The seat-support $g$ is provided with a series of apertures $g^3$ for the reception of this fastening-bolt, so that it may be adjusted lengthwise without moving the supplemental support. A bracket J of medium size is secured to the rear or short upright $e^2$ of the U-beam. It is bolted or otherwise fastened to the outer face of this upright—that is, the face next the platform and near the lower end of the upright. It consists of a plate-like body $j$, which carries a tubular journal $j'$, arranged transversely of this part of the bracket and extending beyond the same both in front and rear thereof, the line of the bearing being at right angles to the platform. At the upper edge of the body-plate and a little distance above the journal-bearing there is a flange $j^2$, projecting out horizontally part way over the said bearing, and the fastening-bolts for the bracket pass through the plate portion of the bracket between this flange and the journal-bearing below. The journal-bearing on this bracket is for the reception of the driving-shaft K for the endless apron or carrier of the platform, being arranged at the inner end of the latter and provided at its rear end, projecting from the said bearing, with a small driving-wheel $k$, which, as shown in the drawings, is a sprocket or chain wheel.

I shall now describe the novel construction which I provide for carrying the reel and its supports, reference being had to Figs. 15 and 16 of the drawings, in which figures the relation of the reel to the U-shaped beam E and the manner in which the latter supports the reel is illustrated. I shall not go into a detailed description of the reel, its supports proper, the shifting levers, &c., as the construction shown is old and well known, but shall merely refer in a general way to so much of the reel structure as is essential to a clear understanding of the novel features shown in detail in Figs. 15 and 16.

X indicates a reel-shaft, which carries and drives a reel of ordinary construction. The reel-support proper consists of a rod $x$, which is mounted at one end in a bracket $x'$, said bracket being secured by means of bolts $x^2$ to the seat-supporting bars H' in close proximity to the upper end of said upright $e'$ of the U-beam E and the short horizontal bar $d^2$, which carries one end of the seat-holding bars H'. The other end of said rod $x$ is mounted in a suitable support $x^3$ at the upper end of the brace-bar $F^3$, as clearly shown in Figs. 15 and 16, the rod $x$ being held in its supports by cotter-pins $x^4$ or other suitable means. A sleeve Y is mounted on said rod $x$ and is provided with a projecting arm $y$, connected by a link $y'$ with the pole $B^2$, so that when the sleeve Y is rocked on the rod $x$ by means of the lever Z the main frame of the machine will be tilted in a well-known manner. Said lever Z is provided with the ordinary pawl or dog to engage the notched plate or sector $y^2$, as usual in these machines, said sector-plate being supported by the bars $d^2$ and the upright $e'$ of the U-beam E and projecting forward, so as to form an intermediate support for the rod $x$. A second sleeve Y', mounted on the rod $x$, carries the fixed upright arm $y^3$, which is connected with the reel-shaft X and supports the latter in its various positions in the usual manner. The various other parts shown—viz., the tumbling-shaft for driving the reel-shaft X and the adjusting-levers for varying the positions of the reel and main frame—are all of well-known construction, and since they form no part of the present invention I shall not give any further description of said parts.

It will be apparent from the foregoing that the reel and its operating mechanism are all supported from the longer upright $e'$ of the U-beam E and the arch F, which supports the upper end of the elevator-frame D, these furnishing a very rigid base on which to mount the reel mechanism, thus doing away with the necessity of providing the cumbersome supporting brackets and posts which have been used heretofore, thereby lessening the number of parts, securing a reduction in weight and material, and giving a structure the parts of which admit of ready and convenient assembling and setting up.

At the rear of the platform there is a wind-board L, hinged at its lower edge to the rear platform-sill in such way that it may swing downward and backward on these hinges. The wind-board is provided at its inner end with a pin $l$, located near the upper edge of the board and extending out in the direction of the length of the latter. This pin may be constructed and secured to the wind-board in any suitable way which will make it strong and durable. In the drawings it is shown as a part of an S-shaped piece of metal $l'$, which is arranged transversely of the board and is secured thereto by bolts or any other suitable device, being fastened to the back thereof. The pin is near the upper end of this piece, about where the upper bend commences. The inner end of the wind-board is connected to the rear upright of the U-beam by a peculiar link L', which at one end is provided with a projection $l^2$, curved upward from and outward a little beyond the end of the link. The extremity of this curved projection is perforated and adapted to receive the pin on the end of the wind-board, thereby providing a journal-bearing for the said pin. The other or rear end of the link is also bent upward slightly and extended in rear of the straight portion or body $l^3$ of the link, this rear extension being indicated by $l^4$, as seen in Fig. 14, from which it will appear that it is of circular form. A slot $l^5$ is made in the body of the link, running lengthwise thereof and extending up into this curved enlargement at the rear end. At the upper end of the rear short upright of the U-beam there is a short pin $e^3$, projecting toward the platform. This pin is received in the slot of the link at the rear end of the latter and is made either as a screw-bolt provided with a head $e^4$ or may be fixed in the upright, in which case this head would be constructed like a nut to be turned on the outer end of the pin. Obviously the wind-board is connected by this link to the said U-beam upright and by joints which will permit it to be swung. When the wind-board is swung up in working position, the pin $e^3$ passes up into the upward turn of the slot at the rear end of the link-rod, as seen in full lines in Fig. 14, thereby securing the wind-board in this position. Now if it is desired to turn the wind-board down the rear end of the link is lifted slightly, as indicated by dotted lines in Fig. 14, thereby bringing the pin into the straight portion of the slot, when the link is free to slip upward on this pin and the wind-board will be free to turn backward and downward on the hinge connection between the forward end of the link and the inner end of the board. When the wind-board reaches substantially a horizontal position, the inner end thereof will come down upon the projecting flange at the upper edge of the bracket J and rest thereon as a stop and support until it is desired to swing it up again into working position.

The main counter-shaft M is mounted in journal-bearings at the rear ends of the cross-bars of the main frame. For the mounting of the outer end of this counter-shaft a large bracket N is secured to the rear end of the outer cross-bar and outer end of the rear platform-sill. This bracket is constructed with what may be called a "body-plate" $n$, arranged lengthwise of the outer cross-bar, to which it is secured at its rear end and extends forward, thence bending outward slightly, and is secured at its front end to the outer end of the rear platform-sill. This plate is the part by means of which the bracket is attached to the main frame and supported thereby. On its outer edge, just in rear of its front end attachment, it is provided with a kind of cup $n'$, opening outward toward the stubble and having on its inside a tubular projection $n^2$, passing under the end of the cross-bar. The cup is constructed with a central perforation $m^3$, of which the tubular projection $n^3$ is a continuation, and together they form the journal-bearing for the outer end of the counter-shaft, which carries a bevel gear-wheel $m$, arranged within the cup. A bracket O is secured to the edge of the front of the cup. This bracket is of peculiar construction. It has a central body $o$ of greater length than width and provided with four arms $o'$, two at each end and extending outward to the edge of the cup, all being preferably bent slightly, so as to stand nearly radial to the cup. These arms are all bolted or otherwise secured firmly to the cup, the latter constituting a support for the bracket. The bracket is arranged with reference to the cup so that its body will be about horizontal and on a line transverse to the main frame. This body-piece is perforated its entire length, and thus provides a journal-bearing for a shaft P, which is the crank-shaft for driving the cutters. The crank-shaft passes through the body of this bracket at its rear end and just outside of the bracket carries a bevel-pinion $p$, with which the bevel-gear $m$ engages, thereby providing for driving the crank-shaft from the counter-shaft, which in turn is driven from the main axle. The rear end of the crank-shaft extends a little beyond the cup and carries at its extremity a sprocket or chain pinion $p'$. By means of this sprocket-pinion at the rear end of the crank-shaft the endless apron or carrier on the platform is driven and also the endless carriers of the elevator.

It has been stated above that the driving-shaft K for the platform-apron is provided at its rear end with a small chain-wheel $k$. Now a driving-chain K' runs around this wheel $k$ and the wheel $p'$. It also runs over a sprocket or chain wheel $d^3$ at the upper end of the elevator-frame and in rear thereof, which is fixed on the shaft by means of which the under elevator is driven. Thence it runs under and engages with a similar toothed or sprocket wheel $d^4$, which is fixed to the rear end of the shaft by means of which the upper elevator-apron is driven, being located with reference to the elevator-frame the same generally as the wheel $d^3$, except that it is at the lower end of the elevator-frame and above the driving-chain instead of underneath it, and over an idler $d^5$ between the wheels $k$ and $p'$. The direction in which this chain runs is indicated by arrows in Fig. 3.

The construction and arrangement of the cup and spider-bracket secured to the edge of the cup provide means for holding the gearing mounted therein firmly in proper working relation. The device for supporting the rear end of the binder-shaft is also intimately connected with the said two parts. This support is a bent arm Q, which is fastened at its lower end to the outside cross-bar of the main frame and extends thence on a bend upward and outward, passing out over the cup and a little way above it and at its outer end beyond the cup and spider-bracket, and, arranged in a higher plane, it provides a journal-bearing for the rear end of the binder-shaft R. This bent arm is also supported on the cup between its two extremities. For this purpose there is a small horizontal and level flange $n^4$ projecting outward from the flange of the cup at the upper side of the latter. The bent arm Q is provided with a tubular boss $q$, depending from the arm and when the latter is in place resting upon this horizontal flange on the cup, being secured thereto by a bolt $q'$ passing down through the boss and flange and fastened by a nut. At its outer end the bent arm is enlarged in both directions to provide a kind of rectangular head $q^2$, the length of which is parallel to the crank-shaft and is constructed with a concave bearing $q^3$, in which the rear end of the binder-shaft is mounted and secured by a bearing-cap $q^4$, also provided with a similar concave bearing $q^5$ and fastened to the plate below by ordinary bolts and nuts. At the rear end of the binder-shaft there is a chain-wheel $r$ fixed thereon and located in the same vertical plane as the chain-pinion at the rear end of the crank-shaft, and the driving-chain K' passes around this wheel also, thereby communicating the required motion to the binder-shaft. The general arrangement of the crank-shaft is of ordinary type. It extends forward from its rear bearing, described above, to the front of the machine, where it is journaled in the outer end of the front platform-sill and is provided with a crank arm or wheel $p^2$, which is connected in the usual way by pitman P' to the cutter-bar.

The counter-shaft M is driven by devices which in general features are like those heretofore used—that is, a chain wheel or pinion S is mounted loosely on the shaft and by some suitable clutch mechanism may be connected and disconnected therewith. A chain $c^2$ runs around the chain-wheel $c'$ on the axle and this wheel S on the counter-shaft, thereby providing for driving the counter-shaft from the main axle. The wheel S is in one piece, with a tubular hub $s$ extended out beyond the wheel on each side thereof and loosely mounted on the counter-shaft, being free to slide lengthwise thereof. At its outer or stubble end this sleeve is constructed to form one member $s'$ of the clutch, the fixed member of which is a small collar $m'$, fastened to the counter-shaft, and at its inner face provided with clutch-teeth $m^2$, with which the teeth on the sliding hub are adapted to engage. At the inner end of the tubular hub $s$ there is a circumferential groove $s^2$, by means of which this hub and the chain-wheel may be moved back and forth on the counter-shaft to connect and disconnect the two members of the clutch. The inner end of the counter-shaft is mounted in a bearing-bracket T, which is secured to the rear end of the inner cross-bar of the main frame. This bearing-bracket has a long tubular body $t$ and is fastened at its outer end to the cross-bar and extends inward therefrom some little distance. The inner end of the counter-shaft is of course journaled in this tubular body. At each end of the said bracket there is a projection or stud extending backward, the outer one $t'$ being next to the sliding chain-wheel on the counter-shaft and the inner one $t^2$ at the opposite end and extending a little farther to the rear than the first named. The projection $t'$ is perforated to provide a seat $t^3$ for a short tube U, which is set in this aperture and is free to slide back and forth therein. This tube is constructed at its outer end with a lug or projection $n$, adapted to enter the circumferential groove in the inner end of the chain-gear hub $s$. A rod V is mounted in a similar aperture $t^4$, running through the inner stud $t^2$, being free to slide back and forth in this bearing. The end of this rod passes through the said stud and is then bent backward at right angles, forming a short arm $v$, extending back beyond the stud in which the rod is mounted. The other end of this sliding rod is inserted in the tubular piece U, the rod being small enough for this purpose, and is secured thereto by a fastening-pin $u'$, and the said two pieces thus connected together form what may be called a "sliding clutch-rod," being free to slide back and forth in their bearings and connected at one end to the movable portion of the clutch. A tension-spring $v'$ is arranged around the rod V, between the inner end of the tube U and the inner projection or stud $t^2$, the normal action of which is to drive the sliding clutch-rod forward to force the two members of the clutch into connection. The lever W for actuating the sliding clutch-rod is entirely independent of all other devices, being completely disconnected therefrom. It is an upright lever mounted at its upper end in a small bearing-bracket $w$ on the rear side piece of the elevator-frame and having a crank-arm or handle $w'$ at its extreme upper end above this support. At its lower end the lever is bent or doubled upon itself, forming what may be called a "hook" or "loop" $w^2$. The short member $w^3$ passes up through an aperture $t^5$ in the extreme outer end of the stud $t^2$. In normal position of rest this lever is intended to stand as indicated in Fig. 3, and when it is desired to suspend the rotation of the counter-shaft the handle of the lever is turned inward, thereby moving the loop or hooked lower end around the outside of its bearing and bringing the lower portion of the long main section of the lever against the angular arm on the end of the clutch-rod, and the parts are so constructed and arranged relatively to each other that this contact will force the clutch-rod inward, thereby sliding the tubular movable portion of the clutch on the counter-shaft and so disconnecting the chain-wheel therefrom. It will be seen from this description that the lower end of the lever is constructed to form a kind of crank, which acts against the angular arm of the clutch-rod when turned against it, as described. The lever extends up far enough to be in convenient reach of the attendant or driver from his seat on the machine, so that he may readily control the action of the counter-shaft. This lever is independent of the clutch devices, so that in backing the machine the clutch will be disconnected without disturbing the lever.

Other parts of a complete grain-harvester, not mentioned and specially described, are no part of my present invention, though necessary, of course, in the construction of a complete working machine. In those parts of the machine which are shown in the drawings and have been particularly described above there may be some mechanical changes without dispensing with the main features of the invention, and such modifications I contemplate, as they may seem to be necessary in the application of the improvements to machines differing somewhat in general features of construction.

Having thus described my invention, what I claim to be new, and desire to secure by Letters Patent, is—

1. In a grain-harvester frame, a grain-platform comprising the parallel longitudinal sills extending the length of the machine in proximity to the main wheel and representing the entire breadth of the platform, and cross-pieces connecting said sills at their ends, in combination with a metallic U-shaped beam, with its central straight body portion secured to and arranged transversely of and beneath said sills and extended some distance in front and rear thereof and with its upturned vertical ends at the lower end of the elevator-frame, and the elevator-frame having its sides secured respectively at their lower ends to the upright portions of the U-beam and at their upper ends to supports carried by said sills, substantially as and for the purposes described.

2. In a grain-harvester frame, two main parallel longitudinal sills extending the entire length of the machine, one sill forming the front sill of the grain-platform and gear-wheel frame and the other the rear sill thereof, two cross-beams connecting said sills together, one located at the lower end of the elevator-frame, and the other near the main wheel, both of said cross-beams extending beyond each of the main sills, said cross-sill extensions constituting supports for the elevator-frame.

3. In a grain-harvester frame, the platform-sills, in combination with a U-beam consisting of a straight horizontal body and straight uprights or standards at the respective ends having its central portion arranged transversely of the platform-sills extended outward in front and rear of said sills and secured thereto, an elevator-frame fastened at its lower end by its sides to the respective upright arms of the U-beam, a cross-bar connecting the upper end of the front U-beam upright with the front side of the elevator-frame, a supporting-bracket secured to the rear of the elevator-frame and the rear or shorter U-beam upright, seat-bars arranged transversely of the machine and secured at their respective ends to the said connecting-bar at the front and the bracket at the rear, and a seat mounted on said bars, substantially as described.

4. In a grain-harvester frame, two parallel horizontal bars mounted on suitable supports over the lower portion of the elevator-frame, in combination with a bracket, H, constructed with a base, $h$, and an extension, $h'$, running upward and backward therefrom, the base arranged between the seat-supporting bars and secured thereto with a transverse slot extending through it at an incline and side guides at the edges of the rear extension, and an elastic seat-support, $g$, having a seat mounted on its upper end and at its lower end extending down the incline of the bracket, through the inclined slot and secured to the bracket-base by a through-bolt or other suitable device, substantially as described.

5. In a grain-harvester frame, two parallel horizontal bars mounted on suitable supports over the lower portion of the elevator-frame, in combination with a bracket, H, constructed with a base, $h$, and an extension, $h'$, running upward and backward therefrom, the base arranged between the seat-supporting bars and secured thereto with a transverse slot extending through it at an incline and side guides at the edges of the rear extension, an elastic seat-support, $g$, having a seat mounted on its upper end and at its lower end extending down between the guide-flanges into the slot of the bracket, and having a series of apertures arranged at intervals at its lower end lengthwise thereof, and a supplemental elastic strip, in width about the same as the seat-support, arranged underneath the latter, fastened to the bracket with the seat-support connection, and extending upward and backward, underneath the seat-support, part way to the upper end thereof, whereby the seat-bar is provided with an elastic supplemental support and is also adjustable lengthwise, substantially as described.

6. In a grain-harvester frame, the rear platform-sill, in combination with a wind-board hinged at its lower edge to said sill and free to swing backward, a link hinged or pivoted at its front end to the upper inner corner of the wind-board, enlarged or bent upward slightly at its outer end and having a slot extending the length thereof and up into said enlargement, an upright standard or support in rear of the front end of the wind-board and provided with a pin to which the said link is loosely connected by means of its slot which receives the pin, substantially as described.

7. In a grain-harvester frame, the platform-sills, in combination with a wind-board hinged at its lower edge to the rear platform-sill and free to turn backward on said hinges into a horizontal position, a standard or support, just inside and in rear of the inner end of the wind-board, provided with a pin near its upper end and a short horizontal flange near its lower end, about on a level with the wind-board hinges, and a link pivoted at its front end to the inner end of the wind-board near the upper edge thereof, provided with a slot, extending lengthwise thereof, turning upward slightly at its rear end, and engaging with the pin on the support, substantially as described.

8. In a grain-harvester frame, the platform-sills, in combination with a wind-board hinged at its lower edge to the rear sill and having a projecting pin at its inner end, a stationary upright or standard in rear of the wind-board pin and having a fixed pin at its upper end, a bracket, J, secured to the lower portion of the upright or standard and having upon its outer face a projecting stud or flange, $j^2$, and a tubular journal-bearing, $j'$, below the flange, and a link, L', slotted lengthwise, with an upward turn at its rear end and connected respectively to the pins on the wind-board and standard, substantially as described.

9. In a grain-harvester frame, the wheel-frame, in combination with a bracket, N, consisting of a plate, $n$, which is secured to the rear outer corner of the wheel-frame and carries a cup, $n'$, on its outer edge arranged vertically and opening outward, a spider-bracket, O, consisting of a tubular central body and several arms extending outward radially therefrom and secured to the edge of the cup, a counter-shaft journaled at its outer end in the bracket N, and having a bevel gear-wheel, $m$, fixed on its outer end and arranged within the cup, a crank-shaft, P, for driving the cutters, journaled at its rear end in the body of the said armed bracket, and a bevel gear-pinion, $p$, fixed on said shaft and engaging with the gear within the cup, substantially as described.

10. In a grain-harvester frame, the front and rear bars or sills of the main or wheel frame; cross-bars arranged inside and outside of the main or ground wheel; the inner cross-bar extended at its front end beyond the front sill, and both the cross-bars extended at their rear ends beyond the rear sill; supports for the elevator-frame mounted upon the forward and rearward extension of the inner cross-bar; and a counter-shaft mounted on the rearward extensions of the two cross-bars in rear of the rear beam of the main frame; all substantially as described and for the purpose specified.

11. In a grain-harvester frame, the counter-shaft mounted in suitable bearing-supports at the rear of the main wheel-frame and provided with one member of a clutch fixed thereon, in combination with a tubular clutch-sleeve mounted loosely on the counter-shaft and carrying the driving-chain pinion, a rod mounted in bearings in which it is free to slide on a line parallel with the counter-shaft, connected at one end with the tubular member of the clutch and at its other or outer end provided with a short crank-arm extending directly backward, an actuating-spring arranged to act upon this clutch-rod to normally force the sliding clutch member into connection with the fixed clutch member on the counter-shaft, and an upright hand-lever mounted in bearings, at its upper and lower ends, in which it is free to turn, and having a kind of crank construction at its lower end, which will be brought against the crank-arm on the sliding clutch-rod when the lever is turned in the right direction, thereby forcing the latter outward and so sliding the tubular clutch member out of contact with the fixed member, substantially as described.

12. In a grain-harvester frame, the counter-shaft mounted at the rear of the wheel-frame and provided with one member of a clutch fixed thereon, in combination with a bearing-bracket, T, secured to the rear end of the inner main-frame cross-bar, having a tubular body in which the inner end of the counter-shaft is journaled, and two studs, $t$, $t^2$, projecting backward from the rear thereof, a clutch-rod consisting of a tubular inner section and a straight rod-section secured therein, the tube being connected to the sliding clutch member and the outer end of the rod provided with a crank-arm outside of its bearing, an actuating-spring arranged between the said projections of the bearing-bracket, at one end acting upon the inner end of the sliding tube and at the other upon the outer bracket-arm, and an upright hand-lever, W, mounted at its upper end in a suitable bearing in which it is free to turn, and at its lower end bent upon itself to form a short returning arm, $W^3$, which is journaled in a bearing at the rear end of the outer stud or projection on the bracket, whereby a kind of crank is provided which acts against the crank-arm on the sliding clutch-rod to force it outward against the tension of the spring when the lever is turned in the proper direction, substantially as described.

BENJAMIN F. STEWART.

Witnesses:
A. A. MURRAY,
I. A. HELMICH.